US012151180B2

United States Patent
Hayashi

(10) Patent No.: US 12,151,180 B2
(45) Date of Patent: Nov. 26, 2024

(54) ROBOT THAT WEARS CLOTHES

(71) Applicant: GROOVE X, INC., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 755 days.

(21) Appl. No.: 17/335,075

(22) Filed: Jun. 1, 2021

(65) Prior Publication Data
US 2021/0283516 A1 Sep. 16, 2021

Related U.S. Application Data

(63) Continuation of application No. PCT/JP2019/048978, filed on Dec. 13, 2019.

(30) Foreign Application Priority Data

Dec. 14, 2018 (JP) .................................. 2018-234175

(51) Int. Cl.
| | | |
|---|---|---|
| *A63H 3/52* | (2022.01) | |
| *A63H 3/28* | (2006.01) | |
| *A63H 3/38* | (2006.01) | |
| *B25J 9/00* | (2006.01) | |
| *B25J 13/08* | (2006.01) | |

(52) U.S. Cl.
CPC .................. *A63H 3/52* (2013.01); *A63H 3/28* (2013.01); *A63H 3/38* (2013.01); *B25J 9/0003* (2013.01); *B25J 13/08* (2013.01); *A63H 2200/00* (2013.01)

(58) Field of Classification Search
CPC ... A63H 3/52; A63H 3/28; A63H 3/38; A63H 2200/00; A63H 3/40; A63H 3/50; A63H 11/10; B25J 9/0003; B25J 13/08; B25J 11/0005; B25J 11/00
See application file for complete search history.

(56) References Cited

U.S. PATENT DOCUMENTS

| | | | |
|---|---|---|---|
| 6,565,371 B1 | 5/2003 | Watanabe | |
| 2003/0078696 A1 | 4/2003 | Sakamoto et al. | |
| 2007/0128979 A1* | 6/2007 | Shackelford | ........... A63H 3/365 446/484 |
| 2018/0333862 A1 | 11/2018 | Hayashi | |
| 2019/0160683 A1 | 5/2019 | Hayashi | |

FOREIGN PATENT DOCUMENTS

| | | |
|---|---|---|
| JP | 200093664 A | 4/2000 |
| JP | 2000323219 A | 11/2000 |

(Continued)

OTHER PUBLICATIONS

International Search Report in PCT/JP2019/048978, mailed Feb. 25, 2020. 4pp.

(Continued)

*Primary Examiner* — Peter J Iannuzzi
(74) *Attorney, Agent, or Firm* — HAUPTMAN HAM, LLP

(57) ABSTRACT

Putting clothes on a robot is facilitated. A robot includes an operation control unit that selects a motion, a drive mechanism that executes the selected motion, a mode setting unit that sets a mode of the robot, and a power supply control unit. The operation control unit restricts a torque of an actuator included in the drive mechanism when a clothes changing mode is set, and the power supply control unit maintains energization of an electronic circuit that realizes a function of the operation control unit, even while in the clothes changing mode.

20 Claims, 6 Drawing Sheets

(56) References Cited

FOREIGN PATENT DOCUMENTS

| | | |
|---|---|---|
| JP | 2001191275 A | 7/2001 |
| JP | 2001191276 A | 7/2001 |
| JP | 200286380 A | 3/2002 |
| JP | 200513391 A | 1/2005 |
| JP | 2006281397 A | 10/2006 |
| JP | 201814365 A | 1/2018 |
| WO | 2017169826 A1 | 10/2017 |
| WO | 2018008323 A1 | 1/2018 |
| WO | 2018216713 A1 | 11/2018 |

OTHER PUBLICATIONS

Office Action in JP Application No. 2020-559342, mailed Sep. 5, 2023. 4pp.

* cited by examiner

ROBOT THAT WEARS CLOTHES

BACKGROUND OF THE INVENTION

Cross-Reference to Related Applications

The present application is a continuation of International Application No. PCT/JP2019/048978, filed Dec. 13, 2019, which claims priority from Japanese Application No. 2018-234175, filed Dec. 14, 2018, the disclosures of which applications are hereby incorporated by reference herein in their entirety.

1. Field of the Invention

The present invention relates to a robot that wears clothes.

2. Description of the Background Art

A human keeps a pet in a search for solace. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides (refer to JP-A-2000-323219 and International Publication WO 2017/169826).

A human has a tendency to attempt to put clothes on a target of affection. For example, a human attempts to express affection by putting various clothes on even an inanimate object such as a soft toy. One reason for the popularity of small dogs is that small dogs answer the human desire to put cute clothes on a target of affection. Consequently, it is thought that if a robot were such that a human felt a desire to put clothes on the robot, empathy toward the robot could be considerably increased.

SUMMARY OF THE INVENTION

The invention, being an invention completed based on the heretofore described idea, has a main object of providing technology for facilitating putting clothes on a robot.

An autonomously acting robot in one aspect of the invention includes an operation control unit that selects a motion of the robot, a drive mechanism that executes the motion selected by the operation control unit, a mode setting unit that sets a mode of the robot, and a power supply control unit.

The operation control unit restricts a torque of an actuator included in the drive mechanism when a clothes changing mode is set. The power supply control unit maintains energization of an electronic circuit that realizes a function of the operation control unit, even while in the clothes changing mode.

According to the invention, putting clothes on a robot is facilitated.

BRIEF DESCRIPTION OF THE DRAWINGS

The heretofore described object, and other objects, characteristics, and advantages, will be further clarified by a preferred embodiment described hereafter, and by the following accompanying drawings.

DETAILED DESCRIPTION OF THE INVENTION

A robot 100 in an embodiment can be dressed in various kinds of clothes. In the case of the autonomously acting robot 100, putting clothes on the robot 100 is difficult when the robot 100 moves freely. A method whereby a power supply of the robot 100 is turned off before putting clothes on the robot 100 is conceivable. However, as an object is to cause the robot 100 to demonstrate an existence like that of a living being, turning off the power supply of the robot 100 in order to put clothes on the robot 100 is undesirable, as a user is made aware that the robot 100 is not a living being. Control of an operation of the robot 100 in the embodiment is carried out in such a way that clothes are easily changed without the power supply being turned off.

Figure 1A:
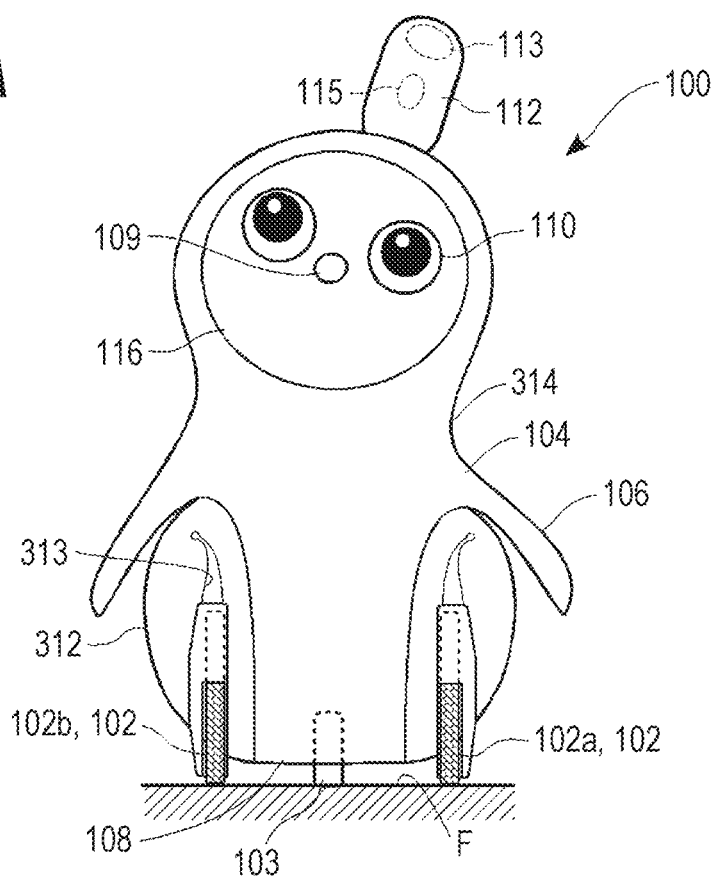
FIG. 1A is a front external view of a robot.
Figure 1B:
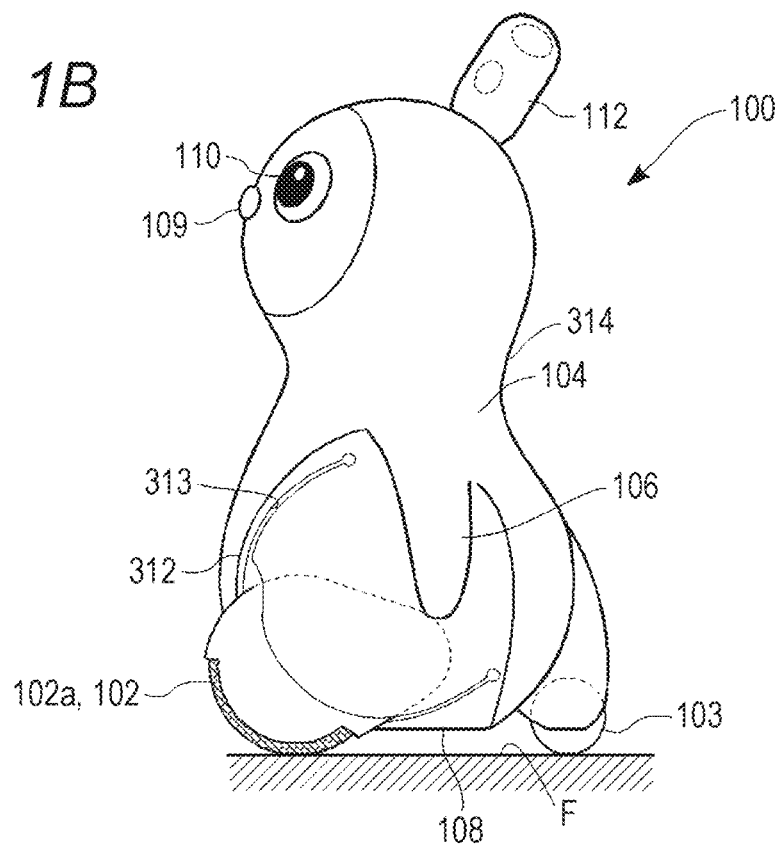
FIG. 1B is a side external view of the robot.

Hereafter, a basic configuration of the robot 100 will be described in relation to FIGS. 1A to 4, after which various activity scenarios of the robot 100 will be described.
Basic Configuration FIGS. 1A and 1B are drawings representing an external appearance of the robot 100. FIG. 1A is a front view, and FIG. 1B is a side view.

The robot 100 is an autonomously acting robot that determines what an action is to be based on an external environment and an internal state. The external environment is recognized using various kinds of sensor, such as a camera or a thermosensor 115. The internal state is quantified as various parameters that express emotions of the robot 100. The robot 100 has an interior of an owner's home as an action range. Hereafter, a human involved with the robot 100 will be called a "user". Among users, an owner or a manager of the robot 100 will be called an "owner".

A body 104 of the robot 100 has a rounded form all over, and includes an outer skin 314 formed of a soft material having elasticity, such as urethane rubber, a resin, or a fiber. The robot 100 may be clothed. A total weight of the robot 100 is in the region of 5 to 15 kilograms, and a height is in the region of 0.5 to 1.2 meters. Owing to the attributes of appropriate weight, roundness, softness, and a pleasant tactile sensation, advantages are realized in that a user can easily hug the robot 100, and feels a desire to hug the robot 100.

The robot 100 includes a pair of front wheels 102 (a left wheel 102a and a right wheel 102b) and one rear wheel 103.

The front wheels 102 are drive wheels, and the rear wheel 103 is a driven wheel. Although the front wheels 102 have no steering mechanism, rotational speed and a direction of rotation of the left and right wheels can be individually controlled. The rear wheel 103 is a caster, and rotates freely in order to cause the robot 100 to move forward and back, and left and right. The rear wheel 103 may also be an omni wheel. By controlling in such a way that the rotational speed of the right wheel 102b is greater than that of the left wheel 102a, the robot 100 can turn left or rotate counterclockwise. By controlling in such a way that the rotational speed of the left wheel 102a is greater than that of the right wheel 102b, the robot 100 can turn right or rotate clockwise.

The front wheels 102 and the rear wheel 103 can be completely housed in the body 104 using a drive mechanism (a pivoting mechanism or a linking mechanism). A left and right pair of covers 312 are provided in a lower half portion of the body 104. The cover 312 is formed of a resin material (rubber, silicone rubber, or the like) having flexibility and elasticity, configures a soft trunk, and can house the front wheel 102. A slit 313 (an aperture portion) that opens from a side face to a front face is formed in the cover 312, and the front wheel 102 can be caused to advance through the slit 313, thereby being exposed to an exterior.

A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a grounding bottom face) formed in a bottom portion of the body 104 comes into contact with the floor surface F.

The robot 100 has two arms 106. There is a hand at a leading end of the arm 106, but there is no function of gripping an object. The arm 106 is capable of simple actions such as raising, bending, waving a hand, and oscillating using a drive of an actuator to be described hereafter. The two arms 106 can be individually controlled.

A facial region 116 is exposed in a front face of a head portion of the robot 100. Two eyes 110 are provided in the facial region 116. An image can be displayed in the eye 110 using a liquid crystal element or an organic EL element, and the eye 100 is a device for representing a line of sight or an expression by moving a pupil or an eyelid displayed as the image. A nose 109 is provided in a center of the facial region 116. An analog stick is provided in the nose 109, and in addition to all of up, down, left, and right directions, a pressing direction can also be detected. Also, a multiple of touch sensors are provided in the robot 100, and a touch by a user can be detected in practically all regions of the robot 100, such as the head portion, the trunk portion, a buttock portion, and the arm. Various sensors, such as a microphone array or an ultrasonic wave sensor that can identify a sound source direction, are mounted in the robot 100. Also, the robot 100 incorporates a speaker, and can emit simple speech.

A horn 112 is attached to the head portion of the robot 100. An omnidirectional camera 113 is attached to the horn 112, and can film a whole of a region above the robot 100 at one time. A thermosensor 115 (a thermal imaging camera) is also incorporated in the horn 112. Also, a multiple of modules (not shown) for carrying out communication utilizing infrared rays are provided in the horn 112, and the modules are installed in a ring form facing a periphery. Because of this, the robot 100 can carry out infrared communication while recognizing a direction. Furthermore, an emergency stop switch is provided in the horn 112, and a user can stop the robot immediately by pulling out the horn 112.

Figure 2:
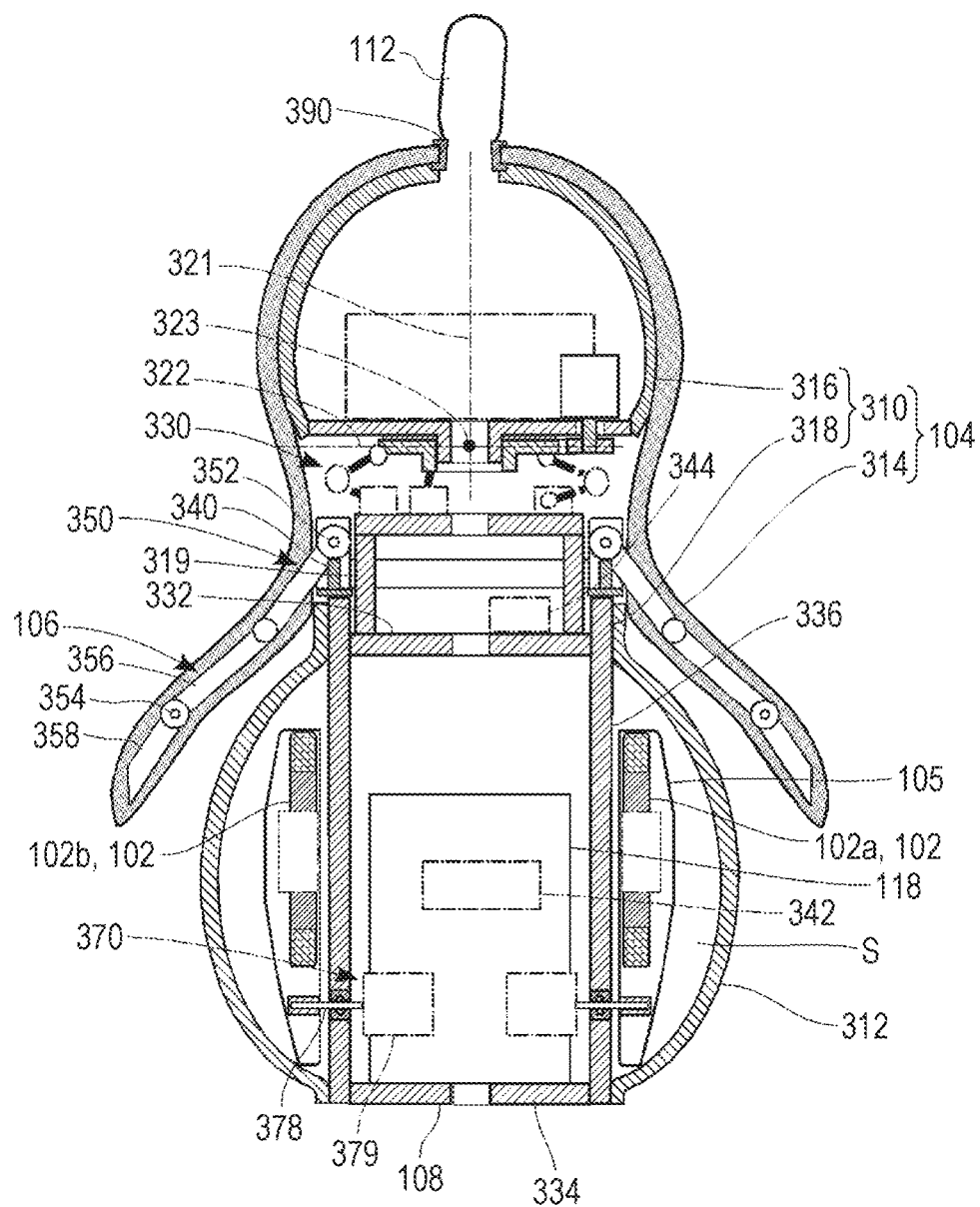
FIG. 2 is a sectional view schematically representing a structure of the robot.

FIG. 2 is a sectional view schematically representing a structure of the robot 100.

The body 104 includes a main body frame 310, the pair of arms 106, the pair of covers 312, and the outer skin 314. The main body frame 310 includes a head portion frame 316 and a trunk portion frame 318. The head portion frame 316 is of a hollow hemispherical form, and forms a head portion framework of the robot 100. The trunk portion frame 318 is of a rectangular cylindrical form, and forms a trunk portion framework of the robot 100. A lower end portion of the trunk portion frame 318 is fixed to a lower plate 334. The head portion frame 316 is connected to the trunk portion frame 318 via a connecting mechanism 330.

The trunk portion frame 318 configures an axial center of the body 104. The trunk portion frame 318 is configured by a left and right pair of side plates 336 being fixed to the lower plate 334, and supports the pair of arms 106 and an internal mechanism. A battery 118, a control circuit 342, and various kinds of actuator and the like are housed inside the trunk portion frame 318. A bottom face of the lower plate 334 forms the seating face 108.

The trunk portion 318 has an upper plate 332 in an upper portion thereof. A bottomed cylindrical support portion 319 is fixed to the upper plate 332. The upper plate 332, the lower plate 334, the pair of side plates 336, and the support portion 319 configure the trunk portion frame 318. An outer diameter of the support portion 319 is smaller than an interval between the left and right side plates 336. The pair of arms 106 configure an arm unit 350 by being assembled integrated with an annular member 340. The annular member 340 forms a circle, and the pair of arms 106 are attached in such a way as to separate in a radial direction along a central line of the annular member 340. The annular member 340 is coaxially fitted over the support portion 319, and placed on upper end faces of the pair of side plates 336. The arm unit 350 is supported from below by the trunk portion frame 318.

The head portion frame 316 has a yaw shaft 321, a pitch shaft 322, and a roll shaft 323. A head shaking action is realized by a pivoting (yawing) of the head portion frame 316 around the yaw shaft 321, a nodding action, a looking up action, and a looking down action are realized by a pivoting (pitching) around the pitch shaft 322, and an action of tilting the head left or right is realized by a pivoting (rolling) around the roll shaft 323. A position and angle of each shaft in a three-dimensional space may change in accordance with a drive aspect of the connecting mechanism 330. The connecting mechanism 330 is formed of a linking mechanism, and is driven by a multiple of motors installed in the trunk portion frame 318.

The trunk portion frame 318 houses a wheel drive mechanism 370. The wheel drive mechanism 370 includes a front wheel drive mechanism and a rear wheel drive mechanism that drive the front wheels 102 and the rear wheel 103 respectively out of and into the body 104. The front wheels 102 and the rear wheel 103 function as "movement mechanisms" that cause the robot 100 to move. The front wheel 102 has a direct drive motor in a central portion thereof. Because of this, the left wheel 102a and the right wheel 102b can be driven individually. The front wheel 102 is supported so as to be able to rotate by a wheel cover 105, and the wheel cover 105 is supported so as to be able to pivot by the trunk portion frame 318.

The pair of covers 312 are provided in such a way as to cover the trunk portion frame 318 from left and right, and are of a smooth curved form in order to provide an outline of the body 104 with roundness. A closed space is formed between the trunk portion frame 318 and the cover 312, and the closed space forms a housing space S for the front wheel 102. The rear wheel 103 is housed in a housing space provided in a lower rear of the trunk portion frame 318.

The outer skin 314 covers the main body frame 310 and the pair of arms 106 from an outer side. The outer skin 314 has a thickness of an extent such that a person feels elasticity, and is formed of a material having elasticity, such as urethane sponge. Because of this, a user feels an appropriate softness when hugging the robot 100, and can make natural physical contact, as a person does with a pet. The outer skin 314 is mounted on the main body frame 310 in an aspect such as to cause the cover 312 to be exposed. An aperture portion 390 is provided in an upper end portion of the outer skin 314. The aperture portion 390 is fitted over the horn 112.

A touch sensor is disposed between the main body frame 310 and the outer skin 314. A touch sensor is embedded in the cover 312. Each of these touch sensors is a capacitive sensor, and a touch in practically all regions of the robot 100 is detected. A touch sensor may also be embedded in the outer skin 314, or a touch sensor may be disposed on an inner side of the main body frame 310.

The arm 106 has a first joint 352 and a second joint 354, and has an arm 356 between the two joints, and a hand 358 on a tip of the second joint 354. The first joint 352 corresponds to a shoulder joint, and the second joint 354 corresponds to a wrist joint. A motor is provided in each joint, whereby the arm 356 and the hand 358 are individually driven. A drive mechanism for driving the arm 106 includes the motors and a drive circuit 344 thereof.

Figure 3:
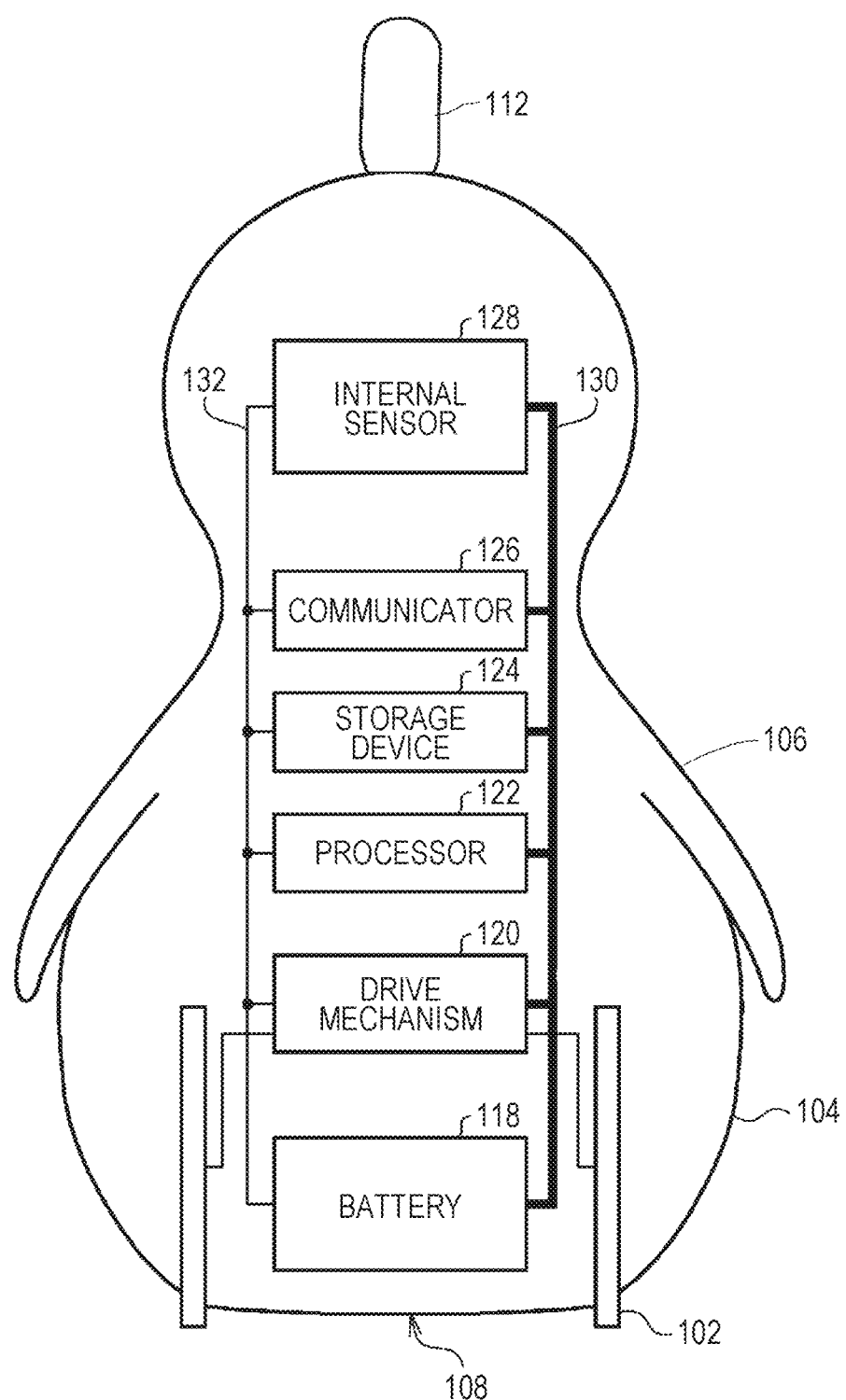
FIG. 3 is a hardware configuration drawing of the robot in an embodiment.

FIG. 3 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described connecting mechanism 330 and wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera, a microphone array, a distance measuring sensor (infrared sensor), the thermosensor 115, a touch sensor, an acceleration sensor, an air pressure sensor, a smell sensor, and the like. The touch sensor is effective in a greater portion of regions of the body 104, and detects a touch by a user based on a change in capacitance. The smell sensor is an already known sensor that applies a principle that electrical resistance changes in accordance with an adsorption of molecules that form a source of a smell.

The communicator 126 is a communication module that carries out wireless communication with various kinds of external device as a target. The storage device 124 is configured of a non-volatile memory and a volatile memory, and stores a computer program and various kinds of setting information. The processor 122 is means of executing a computer program. The drive mechanism 120 includes a multiple of actuators. In addition to this, an indicator, a speaker, and the like are also mounted.

The drive mechanism 120 mainly controls the wheels and the head portion. The drive mechanism 120 causes a direction of movement and a movement speed of the robot 100 to change, and can also cause the wheels to rise and descend. When the wheels rise, the wheels are completely housed in the body 104, and the robot 100 comes into contact with the floor surface F via the seating face 108, taking on the sitting state. Also, the drive mechanism 120 controls the arm 106.

Figure 4:
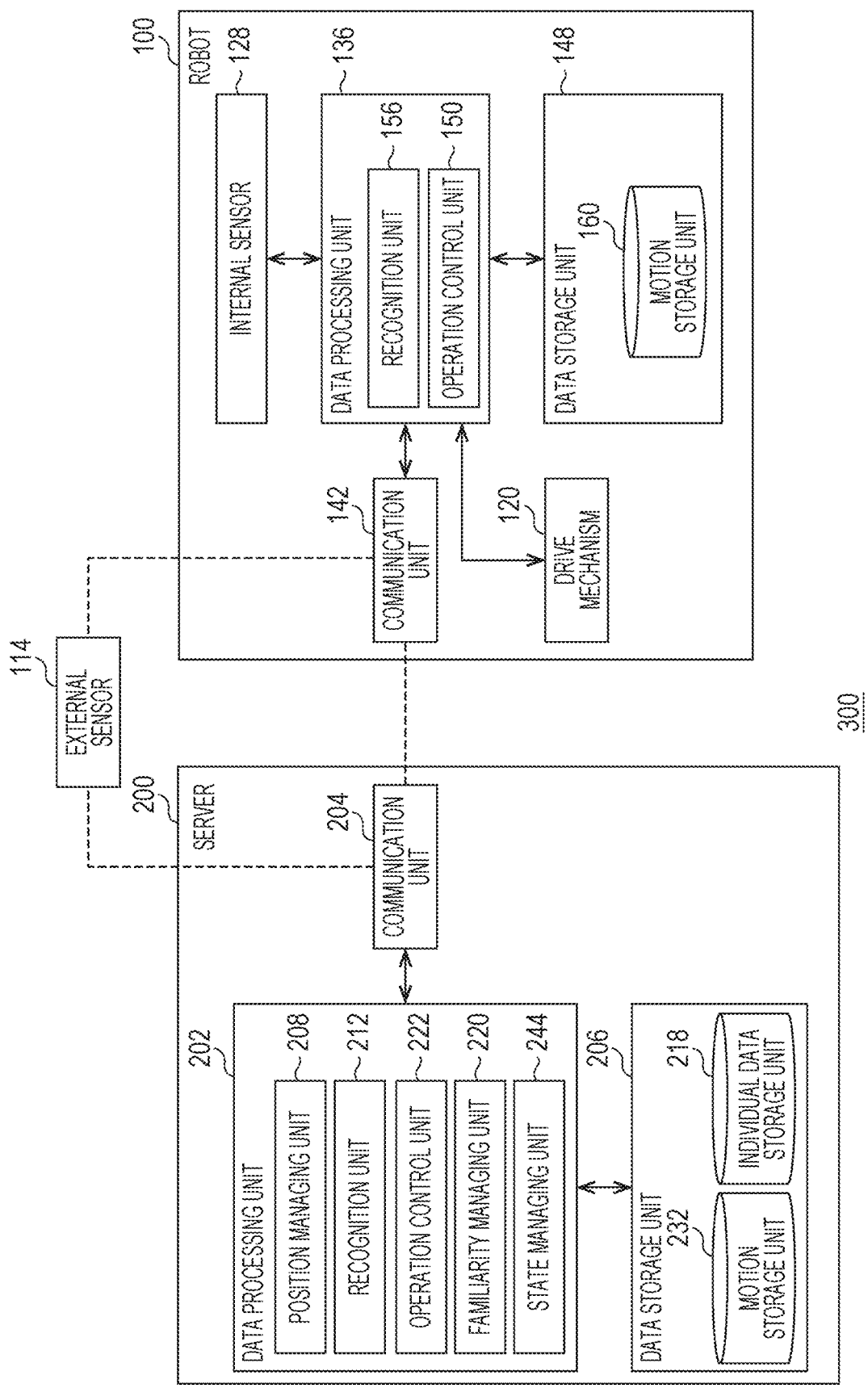
FIG. 4 is a functional block drawing of a robot system in the embodiment.

FIG. 4 is a functional block diagram of a robot system 300.

The robot system 300 includes the robot 100, a server 200, and a multiple of external sensors 114. Each component of the robot 100 and the server 200 is realized by hardware including a computer formed of a central processing unit (CPU), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

The multiple of external sensors 114 are installed in advance in a house. The server 200 manages the external sensor 114, and provides the robot 100 as necessary with a detected value acquired using the external sensor 114. The robot 100 determines what a basic action is to be based on information obtained from the internal sensor 128 and the multiple of external sensors 114. The external sensor 114 is for reinforcing a sensory organ of the robot 100, and the server 200 is for reinforcing a processing capacity of the robot 100. The communicator 126 of the robot 100 regularly communicates with the server 200, and the server 200 may assume responsibility for a process of identifying a position of the robot 100 using the external sensor 114 (refer to International Publication WO 2017/169826).

Server 200

The server 200 includes a communication unit 204, a data processing unit 202, and a data storage unit 206.

The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface between the communication unit 204 and the data storage unit 206.

The data storage unit 206 includes a motion storage unit 232 and an individual data storage unit 218.

The robot 100 has a multiple of operation patterns (motions). Various motions, such as waving the arm 106, approaching an owner while meandering, and staring at an owner with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time when changing from a preceding unit motion to a subsequent unit motion is called an "interval". It is sufficient that an interval is defined in accordance with time needed for a unit motion change or details of a motion. A length of an interval can be regulated.

Hereafter, settings relating to controlling behavior of the robot 100, such as which motion is chosen and when, and regulating output of each actuator when a motion is realized, will collectively be called "behavioral characteristics". Behavioral characteristics of the robot 100 are defined using a motion selection algorithm, a motion selection probability, a motion file, and the like.

In addition to a motion file, the motion storage unit 232 stores a motion selection table that defines a motion to be performed when various kinds of event occur. One or more motions, and a selection probability thereof, are correlated to an event in the motion selection table.

The individual data storage unit 218 stores information regarding a user. Specifically, the individual data storage unit 218 stores familiarity with respect to a user, and master information indicating physical characteristics and behavioral characteristics of the user. The individual data storage unit 218 may also store other attribute information such as age and gender.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a recognition unit 212, an operation control unit 222, a familiarity managing unit 220, and a state managing unit 244.

The position managing unit 208 identifies positional coordinates of the robot 100. The state managing unit 244 manages various kinds of internal parameter, such as various kinds of physical state such as a charging rate, an internal temperature, and a processing load of the processor 122. Also, the state managing unit 244 manages various kinds of emotion parameter that indicate an emotion (loneliness, curiosity, a desire for recognition, and the like) of the robot 100. The emotion parameters constantly fluctuate. A movement target point of the robot 100 changes in accordance with an emotion parameter. For example, when the emotion parameter indicating loneliness is high, the robot 100 sets a place where there is a user as the movement target point.

An emotion parameter changes in accordance with the passing of time. Also, each kind of emotion parameter also changes in accordance with a responsive action to be described hereafter. For example, the emotion parameter indicating loneliness decreases when the robot 100 is "hugged" by an owner, and the emotion parameter indicating loneliness increases little by little when the robot 100 does not visually recognize an owner for a long time.

The recognition unit 212 recognizes an external environment. Various kinds of recognition, such as recognition of weather or season based on temperature and humidity, and recognition of shelter (a safe area) based on an amount of light and temperature, are included in the recognition of the external environment. A recognition unit 156 of the robot 100 acquires various kinds of environmental information using the internal sensor 128, and transmits the environmental information to the recognition unit 212 of the server 200 after carrying out a primary processing.

Specifically, the recognition unit 156 of the robot 100 extracts a moving object, in particular an image region corresponding to a person or an animal, from an image, and extracts a "feature vector" as a collection of feature quantities indicating physical characteristics and behavioral characteristics of the moving object from the extracted image region. A feature vector component (feature quantity) is a numeral wherein a kind of physical or behavioral characteristic is quantified. For example, a width of a human eye is quantified in a range of 0 to 1, forming one feature vector component. A method of extracting a feature vector from a filmed image of a person is an application of already known facial recognition technology. The robot 100 transmits the feature vector to the server 200.

The recognition unit 212 of the server 200 determines what person a filmed user corresponds to by comparing a feature vector extracted from an image filmed by the camera incorporated in the robot 100 and a feature vector of a user (cluster) registered in advance in the individual data storage unit 218 (a user identification process). Also, the recognition unit 212 infers an emotion of a user by carrying out image recognition with respect to an expression of the user. The recognition unit 212 also carries out a user identification process with respect to a moving object other than a person, a dog or a cat that is a pet for example.

The recognition unit 212 recognizes various responsive actions performed with respect to the robot 100, and classifies the actions as pleasant or unpleasant actions. Also, the recognition unit 212 recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for a living being. For example, being hugged is a positive action for the robot 100, and being kicked is a negative action for the robot 100. Positive and negative actions are distinguished depending on whether a responsive action of a user is pleasing or unpleasant for a living being. Being hugged is a positive response indicating a pleasant emotion of a user, and being kicked is a negative response indicating an unpleasant emotion of the user.

The operation control unit 222 of the server 200 determines what a motion of the robot 100 is to be in cooperation with an operation control unit 150 of the robot 100. The operation control unit 222 of the server 200 compiles a movement target point of the robot 100, and a movement route for the movement target point. The operation control unit 222 compiles a multiple of movement routes, and having done so, may select any of the movement routes.

The operation control unit 222 selects a motion of the robot 100 from a multiple of motions in the motion storage unit 232. A selection probability is correlated to each motion for each situation. For example, a selection method such that a motion A is executed with a 20% probability when a pleasant action is performed by an owner, and a motion B is executed with a 5% probability when a temperature reaches 30 degrees or higher, is defined.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that user. When an unpleasant action is detected, familiarity decreases. Also, familiarity of an owner who has not been visually recognized for a long period gradually decreases.

Robot 100

The robot 100 includes a communication unit 142, a data processing unit 136, a data storage unit 148, the internal sensor 128, and a drive mechanism 120.

The communication unit 142 corresponds to the communicator 126 (refer to FIG. 3), and manages a process of communicating with the external sensor 114, the server 200, and another robot 100. The data storage unit 148 stores various kinds of data. The data storage unit 148 corresponds to the storage device 124 (refer to FIG. 3). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface between the communication unit 142, the internal sensor 128, the drive mechanism 120, and the data storage unit 148.

The data storage unit 148 includes the motion storage unit 160, which defines various kinds of motion of the robot 100.

Various kinds of motion file are downloaded from the motion storage unit 232 of the server 200 into the motion storage unit 160 of the robot 100. A motion is identified by motion ID. An operating timing, an operating time, an operating direction, and the like, of the various kinds of actuator (the drive mechanism 120) are defined chronologically in the motion file in order to perform various motions such as sitting by housing the front wheels 102, raising the arm 106, causing the robot 100 to carry out a rotating action by causing the two front wheels 102 to rotate in reverse or by causing only one front wheel 102 to rotate, shaking by causing the front wheels 102 to rotate in a state in which the front wheels 102 are housed, or stopping once and looking back when moving away from a user.

Various kinds of data may also be downloaded into the data storage unit 148 from the individual data storage unit 218.

The data processing unit 136 includes the recognition unit 156 and the operation control unit 150.

The operation control unit 150 of the robot 100 decides what a motion of the robot 100 is to be in cooperation with the operation control unit 222 of the server 200. One portion of motions may be determined by the server 200, and other motions may be determined by the robot 100. Also, a configuration may be such that although the robot 100 determines what a motion is to be, the server 200 determines what a motion is to be when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 150 of the robot 100 instructs the drive mechanism 120 to execute a selected motion. The drive mechanism 120 controls each actuator in accordance with a motion file.

The operation control unit 150 can also execute a motion of holding up both arms 106 as a gesture asking for "a hug" when a user with a high degree of familiarity is nearby, and can also perform a motion of no longer wanting to be hugged by causing the left and right front wheels 102 to alternately and repeatedly rotate in reverse and stop in a housed state when bored of the "hug". The drive mechanism 120 causes the robot 100 to perform various motions by driving the front wheels 102, the arm 106, and a neck (the head portion frame 316) in accordance with an instruction from the operation control unit 150.

The recognition unit 156 of the robot 100 analyzes external information obtained from the internal sensor 128. The recognition unit 156 is capable of visual recognition (a visual unit), smell recognition (an olfactory unit), sound recognition (an aural unit), and tactile recognition (a tactile unit).

The recognition unit 156 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from a smell sensor, an incorporated highly directional microphone, a temperature sensor, and the like. These characteristics are also quantified, forming a feature vector component. The recognition unit 156 identifies a user from a feature vector based on already known technology described in International Publication wo 2017/169826 and the like.

Of a series of recognition processes including detection, analysis, and determination, the recognition unit 156 of the robot 100 carries out a selection and an extraction of information necessary for recognition, and an analytical process such as a determination is executed by the recognition unit 212 of the server 200. A recognition process may be carried out by the recognition unit 212 of the server 200 alone, or may be carried out by the recognition unit 156 of the robot 100 alone, or the two may execute the recognition process while dividing roles, as heretofore described.

When a strong force is applied to the robot 100, the recognition unit 156 recognizes this using a touch sensor and an acceleration sensor, and the recognition unit 212 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the recognition unit 212 of the server 200 may recognize that a "speaking action" has been performed with respect to the robot 100. Also, when a temperature in the region of body temperature is detected, the recognition unit 212 recognizes that a "touching action" has been performed by a user, and when upward acceleration is detected in a state in which touching is recognized, the recognition unit 212 recognizes that a "hug" has been performed. Physical contact when a user raises the body 104 may also be sensed, and a hug may also be recognized by a load acting on the front wheels 102 decreasing.

To summarize, the robot 100 acquires an action of a user as physical information using the internal sensor 128, and the recognition unit 212 of the server 200 determines whether the action is pleasant or unpleasant. Also, the recognition unit 212 of the server 200 executes a user identification process based on a feature vector.

The recognition unit 212 of the server 200 recognizes various kinds of response by a user with respect to the robot 100. "Pleasant" or "unpleasant", and "positive" or "negative", are correlated to one portion of typical responsive actions among various kinds of responsive action. Generally, almost all responsive actions that are pleasant actions are positive reactions, and almost all responsive actions that are unpleasant actions are negative reactions. Pleasant and unpleasant actions are correlated to familiarity, and positive and negative reactions affect an action selection by the robot 100.

The familiarity managing unit 220 of the server 200 changes the familiarity toward a user in accordance with a responsive action recognized by the recognition unit 156. In principle, the familiarity toward a user who carries out a pleasant action increases, while the familiarity toward a user who carries out an unpleasant action decreases.

Each function of the server 200 is realized by a program for realizing the function being loaded into a memory and substantiated (instantiated). Various kinds of process performed by the robot 100 are supplemented by a processing capacity of the server 200. The server 200 can be utilized as a resource of the robot 100. How the server 200 resource is utilized is decided dynamically in accordance with a request from the robot 100. For example, a configuration may be such that when there is a need for the robot 100 to continuously generate complex motions in accordance with values detected by the multiple of touch sensors, processing by the processor 122 in the robot 100 is allocated with priority to selecting and generating motions, and a process for recognizing a peripheral situation from an image is carried out by the recognition unit 212 of the server 200. In this way, various kinds of process of the robot system 300 can be distributed between the robot 100 and the server 200.

A multiple of robots 100 can be controlled by a single server 200. In this case, each function of the server 200 is substantiated independently for each robot 100. For example, the server 200 may prepare the recognition unit 212 for a robot 100B separately from the recognition unit 212 (an instance or an object) for a robot 100A.

Next, an implementation of the robot 100 in the embodiment will be described, with the heretofore described basic configuration as a precondition, and in particular, a description will be given centered on differences between features and objects of the implementation and those of the basic configuration.

SLAM

The robot 100 of the embodiment acquires a large number of filmed images (static images) by regularly filming a periphery using the omnidirectional camera 113. The robot 100 forms a memory based on the filmed images (hereafter called an "image memory").

An image memory is a collection of a multiple of key frames. A key frame is distribution information relating to a feature point (a feature quantity) in a filmed image. The robot 100 of the embodiment forms a key frame using a graph-based simultaneous localization and mapping (SLAM) technology that uses an image feature quantity, or more specifically, SLAM technology based on an oriented FAST and rotated BRIEF (ORB) feature quantity (refer to Japanese Patent Application 2018-14365).

The robot 100 forms an image memory as a collection of key frames, or in other words, an image feature distribution, by regularly forming a key frame while moving. The robot 100 estimates a location of a current point by comparing a key frame acquired at the current point and a large number of key frames already possessed. That is, the robot 100 compares a filmed image actually being visually recognized and filmed images previously visually recognized (a memory), and carries out a "spatial recognition" by coordinating the robot 100's own current situation and a past memory. An image memory formed as a collection of feature points is a so-called map. The robot 100 updates the map while moving and estimating the location of a current point.

A precondition of the robot 100 of the basic configuration is that the robot 100 recognizes a position using the external sensor 114 rather than a key frame. A description will be given assuming that the robot 100 of the embodiment recognizes a place based only on a key frame.

The robot 100 in the embodiment includes a "mode setting unit" for setting various kinds of mode. The robot 100 includes an "eye generating unit" that generates an eye image, an "eye display unit" that causes an eye image to be displayed in the eye 110, and a "clothes detecting unit" that detects an undressing and a dressing of the robot 100. Also, the robot 100 includes a "power supply control circuit" that controls continuity of a multiple of power lines 130.

Changing Clothes

FIGS. 5A to 5D show icons displayed in the eye 110 to correspond to a mode.

The robot 100 includes a multiple of modes. The robot 100 in the embodiment will be described assuming that there are four kinds of mode, those being a "normal mode (filming can be carried out and movement can be carried out)", a "first mode (filming is prohibited but movement can be carried out)", a "second mode (filming is prohibited and movement is prohibited)", and a "clothes changing mode". A user can set a mode of the robot 100 manually using a mode switch (a circular switch, not shown) installed in the horn 112. The mode setting unit sets the mode of the robot 100 in accordance with a mode switch input result.

The eye display unit causes an icon indicating a mode (hereafter called a "mode icon") to be displayed in the eye 110. When the mode has been changed, a user can confirm a current mode by checking the eye 110 of the robot 100. A touch sensor is included in the horn 112. When a user touches the horn 112, the robot 100 pauses. Provided that a user can make contact with the horn 112, the robot 100 can be caused to pause, because of which various kinds of input device installed in the horn 112, such as the mode switch, can be operated unhurriedly.

A configuration may be such that the eye display unit causes a mode icon to be displayed in the eye 110 when the horn 112 is touched. When the hand is removed from the horn 112, the eye display unit deletes the mode icon, and causes a normal pupil image to be displayed. A user can confirm the current mode of the robot 100 by touching the horn 112. Monitors may be installed in a member other than the eye 110, such as the horn 112, and a mode icon may be caused to be displayed in these monitors.

Figure 5A:
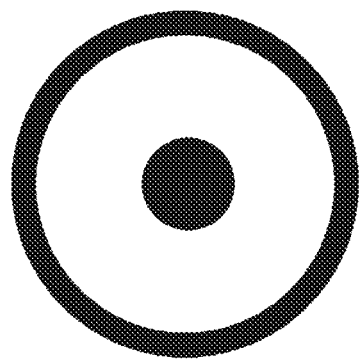
FIG. 5A shows an icon to be displayed in an eye to correspond to a normal mode (filming can be carried out and movement can be carried out)
Figure 5B:
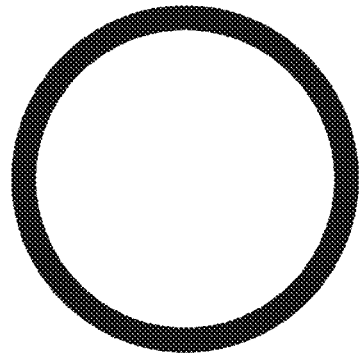
FIG. 5B shows an icon to be displayed in the eye to correspond to a first mode (filming is prohibited but movement can be carried out)
Figure 5C:
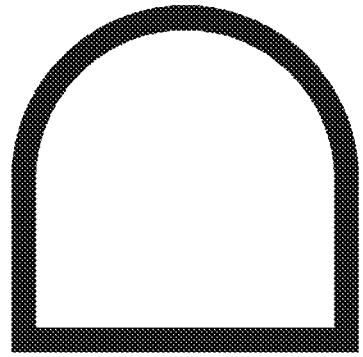
FIG. 5C shows an icon to be displayed in the eye to correspond to a second mode (filming is prohibited and movement is prohibited)
Figure 5D:
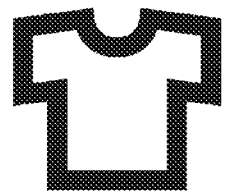
FIG. 5D shows an icon to be displayed in the eye to correspond to a clothes changing mode.

When in the normal mode (filming can be carried out and movement can be carried out), the eye display unit causes the icon shown in FIG. 5A to be displayed in the eye 110. When in the first mode (filming is prohibited but movement can be carried out), the eye display unit causes the icon shown in FIG. 5B to be displayed in the eye 110. When in the second mode (filming is prohibited and movement is prohibited), the eye display unit causes the icon shown in FIG. 5C to be displayed in the eye 110. When in the clothes changing mode, the eye display unit causes the icon shown in FIG. 5D to be displayed in the eye 110.

In the clothes changing mode, the operation control unit 150 causes the front wheel 102 to be housed on an inner side of the cover 312. That is, the robot 100 is prohibited from moving in the clothes changing mode. Also, the operation control unit 150 causes torque of actuators of the arm and the neck to decrease. While in the clothes changing mode, a state is such that strength is lost from the whole body of the robot 100. As a result of this, a user can easily move the arm and the neck of the robot 100, and can easily take clothes off or put clothes on the robot 100. The arm may be caused to lose strength completely by turning off the power supply to the arm actuator. Specifically, it is sufficient that the mode setting unit instructs the power supply control circuit to interrupt the connection between the arm actuator and the power line 130 when set to the clothes changing mode. The power supply to the neck actuator may also be turned off, but as various motions are executed in the clothes changing mode too, the power supply to the neck actuator may be maintained.

In the clothes changing mode, energization of at least one portion of actuators included in the drive mechanism 120, and of the processor 122, is maintained. As the functions of the operation control unit 150 are maintained, the robot 100 can execute various motions, including changing the eye image, outputting speech, and the like, even while changing clothes. Also, the robot 100 can also execute a motion immediately after a changing of clothes is completed.

A user takes clothes off the robot 100 after setting to the clothes changing mode. Subsequently, the user puts new clothes on the robot 100, and changes from the clothes changing mode to another mode, such as the normal mode.

Figure 6A:
FIG. 6A shows an icon to be displayed in the eye when clothes have been put on correctly.
Figure 6B:
FIG. 6B shows an icon to be displayed in the eye when clothes have not been put on correctly.

FIGS. 6A and 6B show an icon displayed in the eye 110 after clothes have been put on.

When clothes have been put on correctly, the eye display unit causes the icon shown in FIG. 6A to be displayed. Meanwhile, when clothes have not been put on correctly, the eye display unit causes the icon shown in FIG. 6B to be displayed. An IC tag is sewn into clothes in advance. Also, an IC tag reader for communicating with the IC tag is included in the body of the robot 100. The IC tag and the IC tag reader are positioned in advance in such a way as to face each other when clothes have been put on normally. The IC tag and the IC tag reader transmit and receive information over a short distance of in the region of several centimeters to several meters using wireless technology based on radio frequency identification (RFID) technology. The IC tag reader of the robot 100 in the embodiment is set with short distance wireless communication in the region of several centimeters as a target. Unless an IC tag attached to a predetermined place in clothes and an IC tag reader provided in a predetermined place in a robot are aligned, the IC tag reader cannot read contents of the IC tag. When the IC tag reader faces the IC tag, "clothes ID" identifying clothes is received from the IC tag. When the IC tag reader cannot read the clothes ID, it can be determined that the robot 100 is not wearing clothes, or at least that clothes are not being correctly worn.

The clothes detecting unit determines whether or not clothes are being correctly worn based on whether or not the IC tag reader can correctly read a signal from the IC tag of the clothes. The IC tag and the IC tag reader may be provided in multiple places.

When clothes are once taken off the robot 100 when changing clothes, the operation control unit 150 executes an undressing motion. It is sufficient that an undressing motion is defined as a motion indicating coldness, bemusement, or surprise, such as causing the robot 100 to shiver or flap the hands. As the power supply is not turned off even in the clothes changing mode, the robot 100 can execute an undressing motion. For example, when a predetermined condition is satisfied, the robot 100 may perform a gesture of feeling the cold as an undressing motion. The predetermined condition may be a condition that a temperature detected by the temperature sensor is a predetermined temperature or lower. Also, the predetermined condition may be a condition that a date and time indicated by an unshown clock function are within a predetermined period (for example, winter). In this way, the operation control unit 150 may select an appropriate undressing motion in accordance with an air temperature, a season, or a time band. An undressing motion may be a gesture of embarrassment, or may be a gesture of asking for clothes to be put on quickly. In any case, it is sufficient that an undressing motion that does not involve movement to another place is executed, in order not to hinder a clothes changing operation by a user. An undressing motion is executed from a user taking clothes C1 off the robot 100 until the user picks up clothes C2 to be newly put on, and attempts to put the clothes C2 on the robot 100.

The operation control unit 150 causes various intermediate motions to be executed while clothes are being newly put on. For example, an expression of a feeling of expectation with regard to changing clothes, eye contact while changing clothes, and the like, can be achieved by a control such as the robot 100 directing the head in the direction of a user, or directing the line of sight in the direction of a user by causing the eye image to change. Also, the operation control unit 150 may determine that a hand is passing through a sleeve when the touch sensor of an arm detects a contact, and control in such a way as to facilitate passing through the sleeve by reducing the torque of the arm or shaking the arm. Also, there is a need for a user to hold the robot 100 and change a posture thereof while changing clothes. The robot 100 may output speech in accordance with the posture at the time. For example, the robot 100 may measure a posture change using the acceleration sensor or an image filmed by the omnidirectional camera 113, and output speech that is in conjunction with the change in posture. By the robot 100 acting independently in this way even while changing clothes, an appearance of a living being that seems to have a will can be expressed. Also, the robot 100 may execute an intermediate motion that is cooperative with respect to a user when changing to favored clothes, and may execute an intermediate motion that is uncooperative with respect to a user when changing to somewhat disliked clothes. A user comes into direct contact with the robot 100 via the act of changing clothes, whereby affection from the user toward the robot 100 is liable to arise.

When a changing of clothes is completed, the operation control unit 150 executes a dressing motion. It is sufficient that a dressing motion is an arbitrary motion such as the robot 100 directing the head toward a user, causing a hand to flap, or rotating an eye. Owing to the dressing motion, a user can feel that the robot 100 is pleased to have had its clothes changed. Also, the user can recognize that the robot 100 seems to like the new clothes. After the clothes changing mode is ended, the torque of each actuator returns, because of which a powerful motion can be executed.

A dressing motion may also be a special motion executed only immediately after clothes have been put on. By preparing this kind of special motion, it can be expected that a user will increase a frequency of changing clothes because of wanting to see a dressing motion. Owing to a number of clothes changings increasing, time for which a user makes contact with the robot 100 increases. A dressing motion is a motion executed only immediately after changing clothes, and may be prepared for each item of clothing, or may be prepared in accordance with the season, current fashion, or the like. For example, a dressing motion repertoire of the robot 100 may be updated by a motion file being downloaded as appropriate into the server 200 from an external server (not shown). Clothes ID and a dressing motion may be managed correlated.

When changing the setting from the clothes changing mode to another mode after a user has caused the robot 100 to change clothes, the mode setting unit changes the setting to another mode on condition that the user removing the hand from the horn 112 has been detected. Detection of a hand being removed may be executed based on an image filmed by the camera, or may be executed based on a value output by the touch sensor provided in the horn 112. According to this kind of control method, safety increases because the robot 100 does not suddenly start moving while a user is controlling the mode switch of the horn 112. Not being limited to the clothes changing mode, a mode control unit actually changes the mode when no touch of the horn 112 is being detected.

Energization of the drive mechanism 120 may be completely stopped while in the clothes changing mode. In this case too, the eye display unit can cause the eye image to change even while clothes are being changed, provided that energization of the processor 122 and the eye 110 is maintained. In other words, various emotions can be expressed using the eye image, without involving an actuator drive.

The actuators of the robot 100 may be provided with a locking function. While in the clothes changing mode, the mode setting unit may lock all or one portion of the actuators, thereby causing the robot 100 to wholly or partially stiffen. Alternatively, control may be such that the actuators are unlocked while in the clothes changing mode, whereby each portion of the robot 100 becomes easier to move.

A user may set the clothes changing mode using speech. For example, when a user emits speech saying "Let's change clothes, shall we?", the mode setting unit may automatically set the clothes changing mode provided that speech collected via the microphone or the like of the robot 100 satisfies a predetermined condition. Also, when a user shows the robot 100 clothes, the mode setting unit may automatically set the clothes changing mode provided that the clothes are detected via the camera or the like of the robot 100. In this case, a behavioral aspect such that the robot 100 seems to expect a change of clothes by seeing clothes can be realized. A user may transmit a command indicating a shift to the clothes changing mode from a portable terminal such as a smartphone.

When a user has taken clothes off the robot 100, the mode setting unit may set the clothes changing mode. A configuration may be such that when the IC tag reader of the robot 100 can no longer read the IC tag of the clothes, the clothes detecting unit detects an undressing. The mode setting unit may set the clothes changing mode with this detection as a trigger. Also, when the robot 100 whose clothes have once been taken off detects a dressing again, the mode setting unit may change the setting from the clothes changing mode to the normal mode (another mode).

A configuration may be such that even when a user operates the mode switch manually, and attempts to cause the clothes changing mode to end, in a state wherein clothes have been taken off, the mode setting unit maintains the clothes changing mode.

The operation control unit 150 may select an intermediate motion or a dressing motion based on clothes to be newly put on the robot 100. The robot 100 may store a clothes wearing history. A wearing history chronologically records who has put what clothes on the robot 100, and when. The operation control unit 150 may change a setting of selection rates of multiple kinds of intermediate motion based on a number of times worn per unit period. According to this kind of control method, an intermediate motion can be caused to change based on a "memory" of what kinds of clothes have been worn to date. The same applies to a dressing motion. For example, when a user always puts the same clothes on the robot 100, the robot 100 may make it difficult to put clothes on by using an intermediate motion such as moving languidly, not meeting the user's eyes, or flapping a hand. According to this kind of control method, a liking or disliking of clothes by the robot 100 may be expressed by behavior. Also, when putting on new clothes or favored clothes (for example, red clothes), an intermediate motion, a dressing motion, or an undressing motion representing pleasure or expectation may be executed.

When clothes A are taken off, and the same clothes A are subsequently put on the robot 100 again, the operation control unit 150 may execute an intermediate motion or a dressing motion differing from that when other clothes B are put on.

The operation control unit 150 may select an intermediate motion or a dressing motion based on familiarity with respect to a user who puts clothes on the robot 100. The operation control unit 150 may change a setting of selection rates of multiple kinds of intermediate motion based on familiarity with respect to a user. According to this kind of control method, an intermediate motion can be caused to change depending on who is to cause the robot 100 to change clothes. The same applies to a dressing motion.

The familiarity managing unit 220 may raise the familiarity with respect to a user who has caused the robot 100 to change clothes. Causing the robot 100 to change clothes is proof that a user cares about the robot 100, because of which it is thought that the robot 100 feeling empathy (increasing the familiarity) for such a user is logical.

A configuration may be such that the operation control unit 150 restricts an operation of the robot 100 when the robot 100 is not wearing clothes. For example, the range within which the robot 100 can act may be reduced, or the movement speed of the robot 100 may be reduced. Alternatively, a configuration may be such that the operation control unit 150 does not allow the robot 100 to move when the robot 100 is not wearing clothes. According to this kind of control method, the robot 100 is easily prevented from becoming dirty due to moving around in a state wherein the robot 100 is not wearing clothes. Also, as clothes protect the main body of the robot 100 from a shock, opportunities for the defenseless robot 100 to be subjected to a shock from an external object may be reduced by causing the robot 100 to be quiet when not wearing clothes.

Conversely, a configuration may be such that an operation of the robot 100 is restricted when the robot 100 is wearing clothes. In this case, the robot 100 is quiet when wearing clothes, because of which the robot 100 is easily prevented from becoming dirty.

After a changing of clothes is completed, the operation control unit 150 may cause the robot 100 to act in such a way as not to move away from the user who has changed the clothes for a certain period. Specifically, the action range of the robot 100 may be temporarily limited to a predetermined range centered on the user, or a predetermined range in a direction in front of the user (a range visually recognizable by the user). According to this kind of control method, a user can be caused to feel that the robot 100 is in a psychological state of wanting the user to see its appearance after changing clothes, or of being happy to wear new clothes. The user infers the psychological state of the robot 100 from this kind of behavioral expression, and a desire to put new clothes on the robot 100 is evoked.

The robot 100 may include a "speech control unit". The speech control unit may cause predetermined speech (a call) to be emitted when new clothes are put on the robot 100 from the head portion, or when clothes are taken off the robot 100.

The state managing unit 244 may cause an emotion parameter of the robot 100 to change when the robot 100 has been wearing the same clothes continuously for a certain period. For example, the desire for recognition parameter may be caused to rise, or the emotion parameter representing mood may be caused to worsen. The operation control unit 150 of the robot 100 may control in such a way that the robot 100 approaches a user less often the worse the mood of the robot 100 becomes, or may cause the robot 100 to approach a user and actively request a change of clothes. Also, the robot 100 may choose a user who causes the robot 100 to change clothes comparatively often based on a dressing history, and hint at a need to change clothes.

After a change of clothes is completed, the robot 100 may execute a motion directed toward another robot 100. For example, the robot 100 may approach the other robot 100. Also, for example, the robot 100 may execute a motion such as facing a direction in which the other robot 100 exists, and raising a hand. According to this kind of control method, an aspect such that the robot 100A seems to be bragging about new clothes to the other robot 100B can be expressed by behavior.

It is thought that by behavioral characteristics of the robot 100 being caused to change in accompaniment to a change of clothes, a user will feel a desire to proactively cause the robot 100 to change clothes. Also, affection of a user toward the robot 100 can be further deepened by actively creating an opportunity for "changing clothes", in which the user and the robot 100 are involved.

The invention not being limited by the heretofore described embodiment and modifications, components can be changed and embodied within a range not departing from the scope of the invention. Various inventions may be formed by combining a multiple of components disclosed in the heretofore described embodiment and modifications as appropriate. Also, some components may be deleted from among all the components shown in the heretofore described embodiment and modifications.

Although a description has been given assuming that the robot system 300 is configured of one or more robots 100 and one server 200, one portion of the functions of the robot 100 may be realized by the server 200, and one portion or all of the functions of the server 200 may be allocated to the robot 100. One server 200 may control a multiple of robots 100, or a multiple of servers 200 may control one or more robots 100 in cooperation.

A third device other than the robot 100 and the server 200 may manage one portion of functions. A collection of the functions of the robot 100 and the functions of the server 200 illustrated in FIG. 4 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

What is claimed is:

1. A robot, comprising:
   a non-transitory computer readable medium configured to store instructions;
   a processor connected to the non-transitory computer readable medium, wherein the processor is configured to execute the instructions for:
   selecting a motion of the robot;
   setting a mode of the robot;
   generate a signal for restricting a torque of an actuator in response to a determination that the mode is a clothes changing mode; and
   maintain power supply to the actuator during the clothes changing mode; and
   a drive mechanism connected to the processor, wherein the drive mechanism is configured to implement the motion, and the drive mechanism includes the actuator.

2. The robot according to claim 1, wherein the processor is configured to execute the instructions for selecting a first motion as the motion in response to a detection of a putting on of clothes being completed.

3. The robot according to claim 2, wherein the first motion is a motion directed toward another robot.

4. The robot according to claim 1, wherein the processor is configured to execute the instructions for maintaining the selected mode until a putting on of clothes is detected as complete.

5. The robot according to claim 1, wherein the processor is configured to execute the instructions for:
   selecting a first motion in response to detecting putting on of clothes used a first number of times; and
   selecting a second motion in response to putting on of clothes used a second number of time, wherein the first number is greater than the second number, and the first motion is different from the second motion.

6. The robot according to claim 1, wherein the processor is configured to execute the instructions for:
   setting the mode in accordance with an input from a mode switch in the robot, and
   maintaining the clothes changing mode until both a condition that a completion of a putting on of clothes is detected and a condition that a user removes a hand from a region in which the mode switch is located are satisfied.

7. The robot according to claim 1, wherein the processor is configured to execute the instructions for setting the clothes changing mode in response to detecting an undressing of the robot.

8. A robot, comprising:
   a non-transitory computer readable medium configured to store instructions;
   a sensor;
   a display;
   a processor connected to the non-transitory computer readable medium, wherein the processor is configured to execute the instructions for:

generating a dressing signal indicating dressing or undressing of the robot based on an output of the sensor;
selecting a motion of the robot based on the dressing signal;
setting a mode of the robot based on the dressing signal;
generating an image based on the set mode; and
instructing the display to display the generated image; and
a drive mechanism connected to the processor, wherein the drive mechanism is configured to implement the motion.

9. The robot according to claim 8, wherein the display is located in an eye of the robot.

10. The robot according to claim 8, further comprising a switch, wherein the processor is configured to execute the instructions for setting the mode based on an output of the switch.

11. The robot according to claim 8, wherein the processor is configured to execute the instructions to instruct the drive mechanism to retract a wheel into the robot in response to the dressing signal indicating dressing or undressing of the robot.

12. The robot according to claim 8, wherein the processor is configured to execute the instructions for determining completion of dressing or undressing of the robot based on the output of the sensor.

13. The robot according to claim 12, wherein the processor is configured to execute the instructions for selecting the motion indicting coldness in response to the dressing signal indicating undressing of the robot followed by a determination of completion of the undressing of the robot.

14. The robot according to claim 12, further comprising a speaker, wherein the processor is configured to execute the instructions for:
generating a speech signal in response to the dressing signal indicating dressing the robot and prior to the determination of completion of the dressing, and
instructing the speaker to output audio based on the speech signal.

15. The robot according to claim 12, wherein the processor is configured to execute the instructions for selecting the motion to be a dressing motion in response to the dressing signal indicating dressing followed by a determination that the dressing is complete.

16. The robot according to claim 15, wherein the processor is configured to execute the instructions for maintaining the dressing motion for a predetermined period of time following the determination that the dressing is complete.

17. The robot according to claim 15, further comprising a detector configured to detect a type of clothing, wherein the processor is configured to execute the instructions for selecting the dressing motion based on the detected type of clothing.

18. The robot according to claim 12, further comprising an actuator in the drive mechanism, wherein the processor is configured to execute the instruction for:
generating a signal for restricting a torque of the actuator in response to the dressing signal indicating dressing or undressing; and
maintaining power supply to the actuator during a time period in which the dressing signal indicates dressing or undressing.

19. The robot according to claim 18, wherein the processor is configured to execute the instructions for removing the restriction on the torque of the actuator in response to a determination that the dressing or undressing is complete.

20. The robot according to claim 12, wherein the processor is configured to execute the instructions for instructing the drive mechanism to maintain the robot within a predetermined proximity of a user for a predetermined time following a determination that the dressing or undressing is complete.

\* \* \* \* \*